(12) United States Patent
Donnay et al.

(10) Patent No.: US 9,648,868 B1
(45) Date of Patent: May 16, 2017

(54) DECOY MOTION DEVICE

(71) Applicants: Steven Joseph Donnay, Cold Springs, MN (US); Kevin Ervin Meier, Cold Springs, MN (US); Jeffrey Roger Reiter, Cold Springs, MN (US)

(72) Inventors: Steven Joseph Donnay, Cold Springs, MN (US); Kevin Ervin Meier, Cold Springs, MN (US); Jeffrey Roger Reiter, Cold Springs, MN (US)

( * ) Notice: Subject to any disclaimer, the term of this patent is extended or adjusted under 35 U.S.C. 154(b) by 0 days.

(21) Appl. No.: 15/274,912

(22) Filed: Sep. 23, 2016

(51) Int. Cl.
*A01M 31/06* (2006.01)

(52) U.S. Cl.
CPC .................. *A01M 31/06* (2013.01)

(58) Field of Classification Search
CPC ............................................. A01M 31/06
USPC ................................................... 43/2, 3
See application file for complete search history.

(56) References Cited

U.S. PATENT DOCUMENTS

| | | | | |
|---|---|---|---|---|
| 2,787,074 A * | 4/1957 | Miller | A01M 31/06 | 43/3 |
| 5,392,554 A * | 2/1995 | Farstad | A01M 31/06 | 43/3 |
| 6,408,559 B2 * | 6/2002 | Mathews | A01M 31/06 | 43/3 |
| 6,481,147 B2 * | 11/2002 | Lindaman | A01M 31/06 | 43/2 |
| 6,675,522 B2 * | 1/2004 | Mathews | A01M 31/06 | 43/3 |
| 7,958,666 B2 * | 6/2011 | Rogers | A01M 31/06 | 43/3 |
| 8,051,598 B2 * | 11/2011 | Stillwell | A01M 31/06 | 43/2 |
| 8,245,436 B2 * | 8/2012 | Dunkin | A01M 31/06 | 43/3 |
| 8,484,883 B2 * | 7/2013 | Rogers | A01M 31/06 | 43/2 |
| 8,919,028 B2 * | 12/2014 | Young | A01M 31/06 | 43/3 |
| 9,101,128 B2 * | 8/2015 | Barley | A01M 31/06 | |
| 9,258,993 B2 * | 2/2016 | Szechenyi | A01M 31/06 | |
| 2005/0138855 A1 * | 6/2005 | Jensen | A01M 31/06 | 43/3 |
| 2006/0053675 A1 * | 3/2006 | Lindaman | A01M 31/06 | 43/2 |
| 2006/0143968 A1 * | 7/2006 | Brint | A01M 31/06 | 43/2 |
| 2008/0029659 A1 * | 2/2008 | Weber | A01M 31/06 | 248/156 |
| 2008/0172920 A1 * | 7/2008 | Brint | A01M 31/06 | 43/2 |
| 2011/0232154 A1 * | 9/2011 | Crank, Jr. | A01M 31/06 | 43/3 |

(Continued)

FOREIGN PATENT DOCUMENTS

CA          2447102 A1 *   4/2004   ............ A01M 31/06

*Primary Examiner* — Darren W Ark
(74) *Attorney, Agent, or Firm* — Dave Alan Lingbeck

(57) ABSTRACT

A decoy motion device for removably supporting and moving a decoy back and forth about a longitudinal axis of the device. The decoy motion device includes a stand; a motion actuating assembly removably mounted upon the stand; and a pivotable elongate support member in operable communication with the motion actuating assembly and adapted to support and pivot a decoy.

8 Claims, 3 Drawing Sheets

FIG. 1

(56) References Cited

U.S. PATENT DOCUMENTS

| | | | |
|---|---|---|---|
| 2015/0208641 A1* | 7/2015 | Gurner, III | A01M 31/06 43/2 |
| 2016/0021871 A1* | 1/2016 | Holste | A01M 31/06 43/3 |
| 2017/0055521 A1* | 3/2017 | Denmon | A01M 31/06 |

* cited by examiner

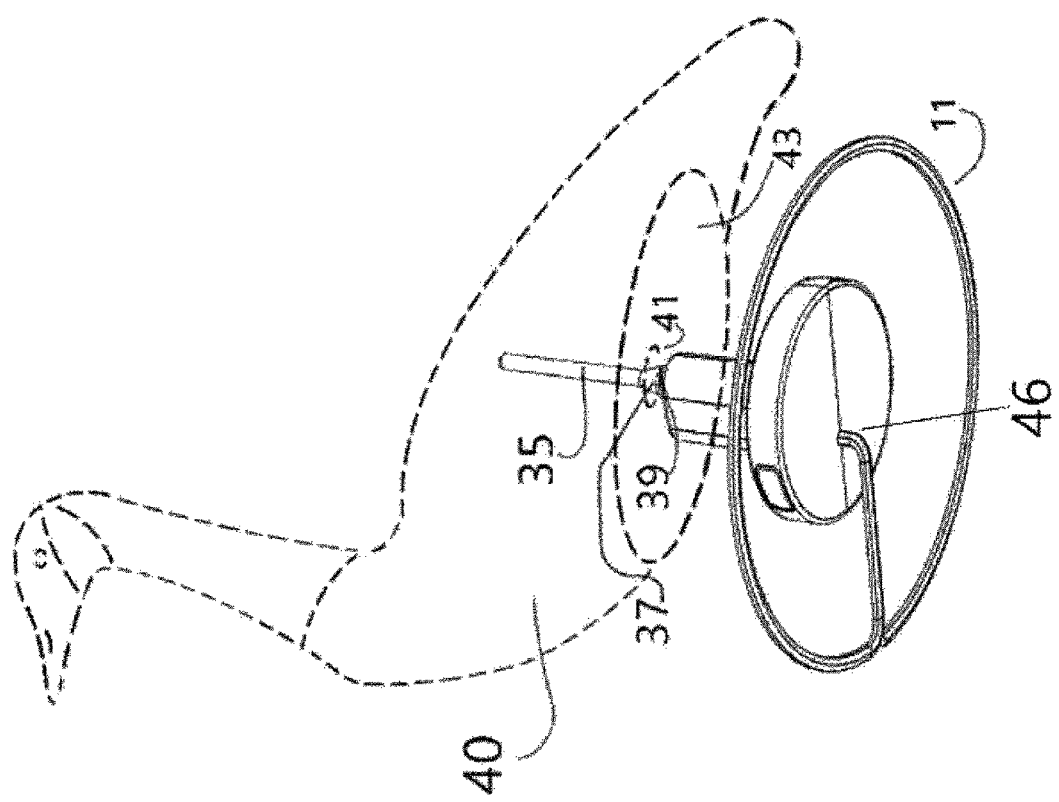

DECOY MOTION DEVICE

BACKGROUND OF THE INVENTION

Field of the Invention

The present invention relates to motion devices and more particularly pertains to a new decoy motion device for removably supporting and moving a decoy back and forth.

Description of the Prior Art

The use of motion devices is known in the prior art. More specifically, motion devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a transducer located on a housing; a switch located on the housing; a transmitter located within the housing, and in communication with the transducer; a receiver; a CPU located within the electronics compartment; a motorized, bird decoy with a plug removably attachable to the connection plug, a decoy stand base; a decoy stand rod extending generally orthogonally from the decoy stand base; a rotatable sleeve in rotatable communication with the decoy stand rod; a bird shaped decoy fixedly attached to the rotatable sleeve. Another prior art includes a central base with a motor which moves a rotating member of the base. Several arms of a predetermined length are connected to the rotating member of the base, and satellite decoy elements are connected to outer ends of the arms. Also another prior art includes a first motor reciprocating the first turkey decoy between up and down positions. The motion imparting assembly also includes a second motor reciprocating the first and second turkey decoy between left and right positions. Yet, another prior art includes a remotely-operated Electronic Rotatable Decoy Stand designed to support and impart rotational motion to a male turkey decoy. The remotely-operated electronic rotatable decoy stand is removably coupled to a male turkey decoy. While these devices fulfill their respective, particular objectives and requirements, the aforementioned patents do not disclose a new decoy motion device.

SUMMARY OF THE INVENTION

The general purpose of the present invention, which will be described subsequently in greater detail, is to provide a new, decoy motion device which has many of the advantages of the motion devices mentioned heretofore and many novel features that result in a new decoy motion device which is not anticipated, rendered obvious, suggested, or even implied by any of the prior art motion, devices, either alone or in any combination thereof. The present invention includes a stand; a motion actuating assembly removably mounted upon the stand; and a pivotable elongate support member in operable communication with the motion actuating assembly and adapted to support and pivot a decoy. None of the prior art includes the combination of the elements of the present invention.

There has thus, been outlined, rather broadly, the more important features of the decoy motion device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new decoy motion device which has many of the advantages of the motion devices mentioned heretofore and many novel features that result in a new decoy motion device which is not anticipated, rendered obvious, suggested, or even implied by any of the prior art motion devices, either alone or in any combination thereof.

Still another object of the present invention is to provide a new decoy motion device for detachably supporting and moving a decoy back and forth about, a common axis.

Still yet another object of the present invention is, to provide a new decoy motion device that allows a user to quickly and conveniently set up the motion decoy device without modifying the decoy itself.

Even still another object of the present invention is to provide a new decoy motion device that simply involves inserting the elongate support member into the opening into the decoy without having to fasten the elongate support member or any part of the decoy motion device directly to the decoy unlike all others.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom perspective view of the present invention.

DETAILED DESCRIPTION OF THE INVENTION

Figure 1:
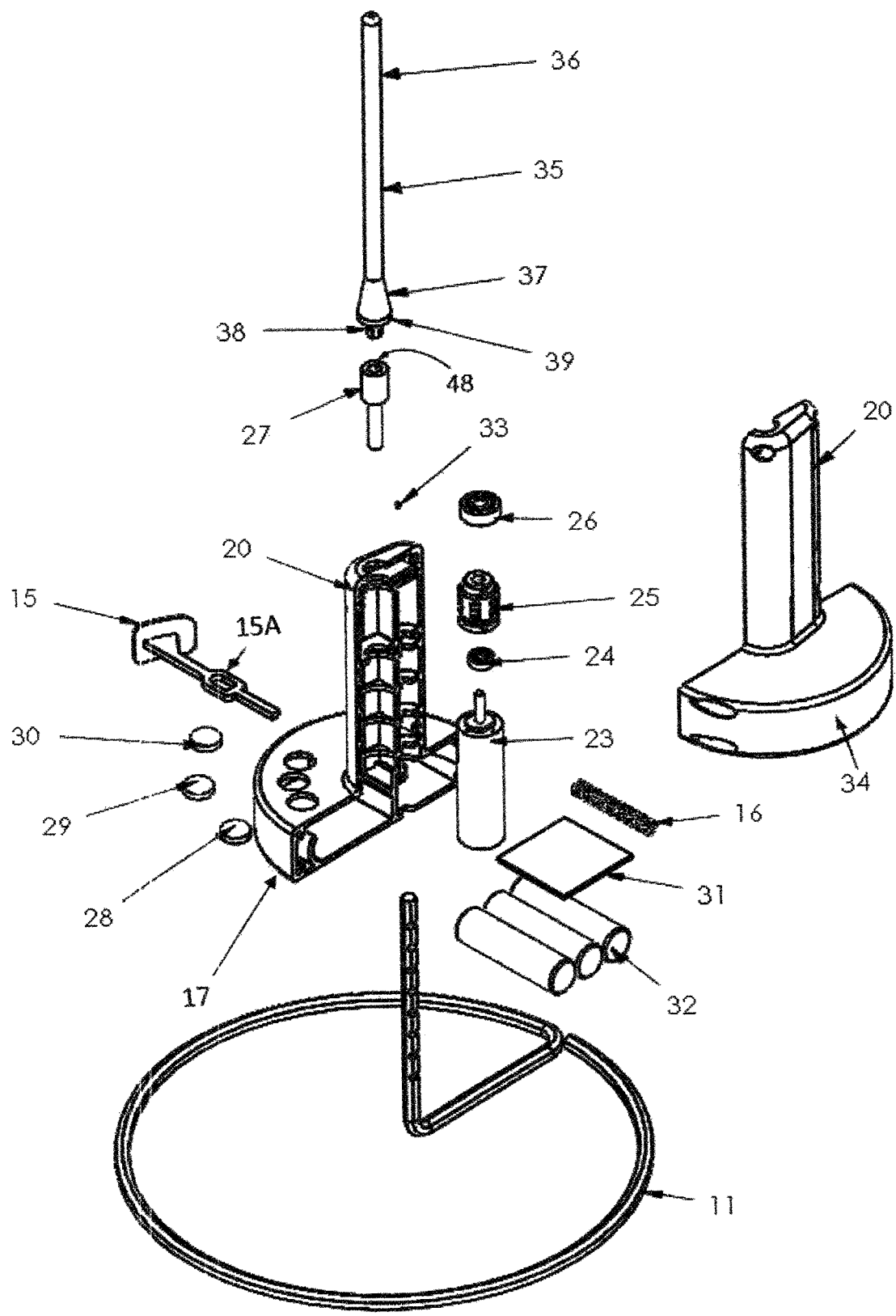
FIG. 1 is an exploded perspective view of a new decoy motion device according to the present invention.
Figure 2:
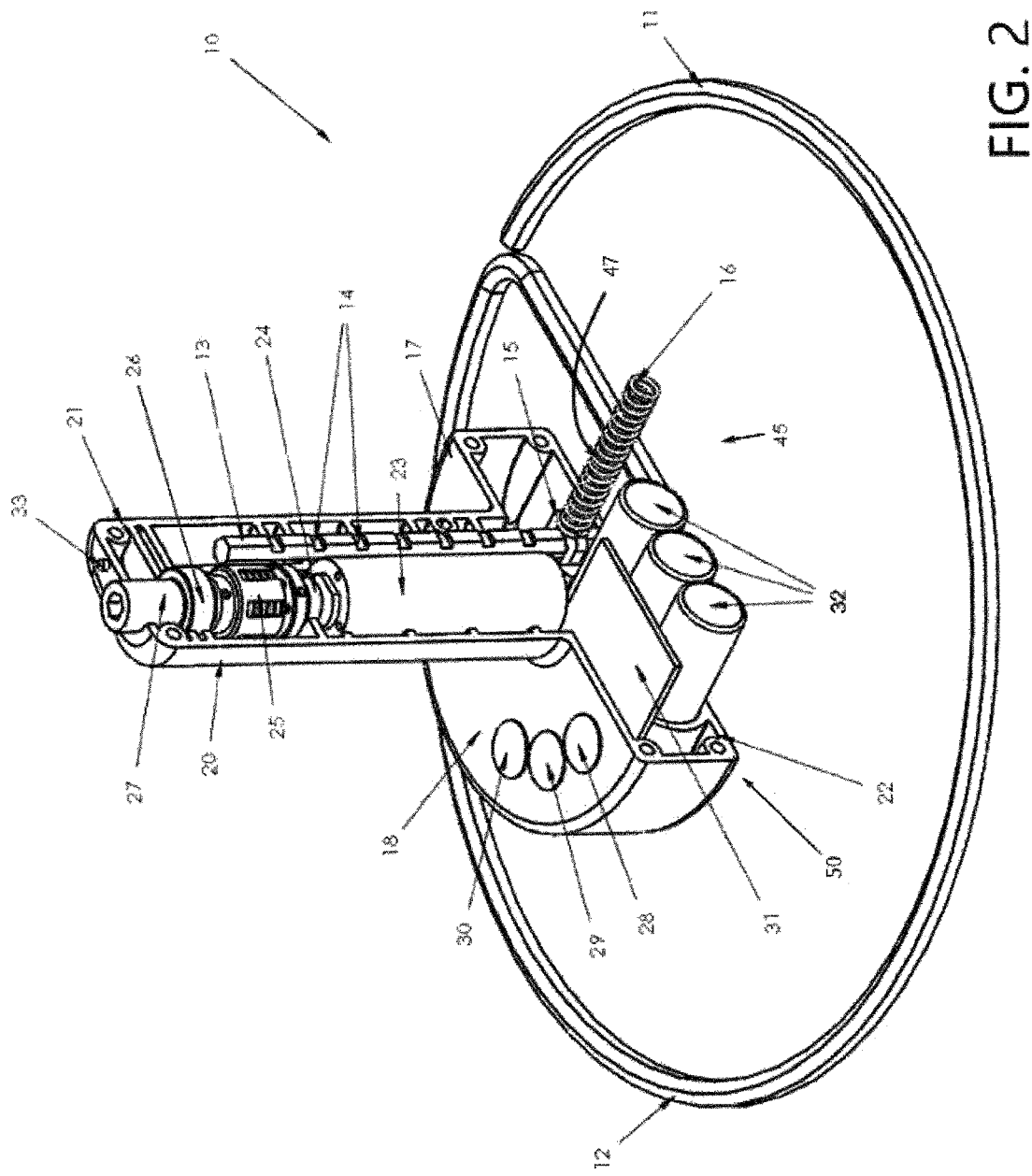
FIG. 2 is a cross-sectional perspective view of the present invention.

With reference now to the drawings, and in particular to FIGS. 1 through 3 thereof, a new decoy motion device embodying the principles and concepts of the present invention and generally designated by the reference numeral 10 will be described.

As best illustrated in FIGS. 1 through 3, the decoy motion device 10 may generally comprise a stand 11; a motion actuating assembly 45 removably mounted upon the stand 11; and a pivotable elongated support member 35 in operable and conventional communication with the motion, actuating assembly 45 and adapted to support and pivot a decoy 40. The stand 11 may include a base 12 and an upright support shaft 13 having notches 14 disposed in the support shaft 13 and spaced along a length thereof.

The motion actuating assembly 45 may include a housing 17 including a base portion 18 having a side wall 34 and a bottom wall 22 with an opening 46 disposed through the bottom wall 22, and also including an elongate portion 20 having a top end 21 and integrally extending upwardly from the base portion 18. The support shaft 13 of the stand 11 may be removably received inside and longitudinally of the elongate portion 20 of the housing 17 through the opening 46 in the bottom wall 22 of the housing 17 to support the housing 17. The motion actuating assembly 45 may further include a height adjustment member 47 including a biased element 16 and an elongate fastener 15 conventionally engaged with the biased element 16 and removably and biasedly received in any one of the notches 14 to set the housing 17 at a selected height upon the stand 11 relative to the base 12 with the biased element 16 conventionally accessible through the side wall 34 of the base portion 18. The motion actuating assembly 45 may also include a motor 23 conventionally disposed in the housing 17, a rotatable drive shaft 27 in conventional communication with the motor 23 and a power source 32 conventionally disposed in the housing 17 and in conventional communication with the motor 23. The motion actuating assembly 45 may further include a first bearing 24 in conventional communication with the motor 23, a clutch 25 in conventional communication with the first bearing 24, and a second bearing 26 in conventional communication with the clutch 25 and with the drive shaft 27.

As illustrated in FIGS. 1 through 3, the elongated support member 35 may have a bottom end 38, a rigid main portion 36, and an elastomeric bottom portion 37 conventionally depending from the main portion 36 and adapted to engage and wedge in an opening 41 in a bottom 43 of a decoy 40 with the decoy 40 pivoting with the elongate support member 35. The bottom portion 37 may be tapered outwardly from the main portion 37 to the bottom end 38 of the elongate support member 35 to form a conical shape. The main portion 36 of the elongate support member 35 may be adapted to extend inside and stabilize the decoy 40.

As shown in FIGS. 1 and 2, the drive shaft 27 may have an upper portion 48 which extends through the top end 21 of the elongate portion 20 of the housing 17. The upper portion 48 of the drive shaft 27 may have a socket top end 49. The elongated support member 35 may have a shaft extension 39 conventionally extending axially from the bottom end 38 thereof and removably and engagably received in the socket top end 49 with the elongated support member 35 being pivotable with the drive shaft 27. The motion actuating assembly 45 may further include a control assembly 50 in operable and conventional communication with the motor 23 and the power source 32. The control assembly 50 may include a circuit board 31 conventionally disposed in the housing 17 and conventionally interconnecting the power source 32 and the motor 23 to control the pivotable speed, the duration of continuous operation and the pivotable motion of the decoy 40. The control assembly 50 may also include an on/off power switch 30 conventionally connected to the circuit board 31 and conventionally disposed upon the housing 17 to energize the motor 23, and may further include a mode selector switch 29 also conventionally connected to the circuit board 31 and conventionally disposed upon the housing 17 to control pivoting of the decoy 40. The motion actuating assembly 45 may further include a light-emitting member 33 conventionally disposed in the top end 21 of the elongate portion 20 of the housing 17 and may also include a light switch 28 conventionally disposed upon the housing 17 and in conventional communication with the power source 32 and the light-emitting member 33 to energize the light-emitting member 33 to aid in securing the decoy 40 to the elongated support member 35.

In use, the stand 11 may be positioned upon a ground. The motion, actuating assembly 45 may then be removably mounted upon the stand 11 with the elongated support member 35 removably mounted to the motion actuating assembly 45. The housing 15 may be removably mounted upon the upright support shaft 13 with the upright support shaft 13 disposed through the opening 46 of the bottom wall 22 of the housing 17. The housing 17 may be positioned at selected heights upon the upright support shaft 13 relative to the base 12. The elongate support member 35 may be removably inserted into the opening 41 in the bottom 43 of the decoy 40. The bottom portion 37 may be removably wedged sand engaged in the opening 41 of the decoy 40 so that the decoy 40 pivots with the elongated support member 35. The motor 23 may then be energized to pivot the elongated support member 35 and the decoy 40 for as long as desired or programmed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the decoy motion device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A decoy motion device comprising:
   a stand including a base and an upright support shaft having notches disposed in the support shaft and spaced along a length thereof;
   a motion actuating assembly removably mounted upon the stand, wherein the motion actuating assembly includes a housing including a base portion having a bottom wall with an opening disposed through the bottom wall, and also including an elongate portion extending upwardly from the base portion, wherein the support shaft of the stand is removably received inside and longitudinally of the elongate portion of the housing through the opening in the bottom wall of the housing to support the housing; and
   a pivotable elongated support member in operable communication with the motion actuating assembly and adapted to support and pivot a decoy.

2. The decoy motion device as described in claim 1, wherein the motion actuating assembly further includes a height adjustment member including a biased element, an elongate fastener in communication with the biased element and removably and biasedly received in any one of the notches to set the housing at a selected height upon the stand relative to the base.

3. The decoy motion device as described in claim 1, wherein the motion actuating assembly further includes a motor, a power source, and a control assembly in operable communication with the motor and the power source, wherein the control assembly includes a circuit board disposed in the housing and interconnecting the power source and the motor to control motion of the decoy.

4. The decoy motion device as described in claim 3, wherein the control assembly also includes an on/off power switch connected to the circuit board and disposed upon the housing to energize the motor, and further includes a mode selector switch also connected to the circuit board and disposed upon the housing to control pivoting of the decoy.

5. The decoy motion device as described in claim 3, wherein the motion actuating assembly further includes a light-emitting member disposed in the top end of the elongate portion of the housing and also includes a light switch in communication with the power source and the light-emitting member to energize the light-emitting member to aid in securing the decoy to the elongated support member.

6. A decoy motion device comprising:
a stand including a base and an upright support shaft having notches disposed in the support shaft and spaced along a length thereof;
a motion actuating assembly removably mounted upon the stand, wherein the motion actuating assembly includes a housing including a base portion having a bottom wall with an opening disposed through the bottom wall, and also including an elongate portion having a top end and extending upwardly from the base portion, wherein the motion actuating assembly also includes a motor disposed in the housing, a rotatable drive shaft in communication with the motor and a power source disposed in the housing and in communication with the motor; and
a pivotable elongated support member in operable communication with the motion actuating assembly and adapted to support and pivot a decoy, wherein the elongated support member has a bottom end, a rigid main portion, and, an elastomeric bottom portion depending from the main portion and adapted to engage and wedge in an opening in a bottom of a decoy with the decoy pivoting with the elongated support member, wherein the bottom portion is tapered outwardly from the main portion to the bottom end of the elongated support member to form a conical shape, wherein the main portion of the elongated support member is adapted to extend inside and stabilize the decoy.

7. The decoy motion device as described in claim 6, wherein the drive shaft has an upper portion which extends through the top end of the elongate portion of the housing, wherein the upper portion of the drive shaft has a socket top end.

8. The decoy motion device as described in claim 7, wherein the elongated support member has a shaft extension extending axially from the bottom end thereof and removably and engagably received in the socket top end with the elongated support member being pivotable with the drive shaft.

\* \* \* \* \*